US009240631B2

(12) United States Patent
Westrick (10) Patent No.: US 9,240,631 B2
(45) Date of Patent: Jan. 19, 2016

(54) REDUCED GROUND PLANE SHORTED-PATCH HEMISPHERICAL OMNI ANTENNA

(71) Applicant: Michael Westick Westrick, Huntertown, IN (US)

(72) Inventor: Michael Westick Westrick, Huntertown, IN (US)

(*) Notice: Subject to any disclaimer, the term of this patent is extended or adjusted under 35 U.S.C. 154(b) by 0 days.

(21) Appl. No.: 14/024,155

(22) Filed: Sep. 11, 2013

(65) Prior Publication Data

US 2015/0069134 A1  Mar. 12, 2015

(51) Int. Cl.
G06K 19/06 (2006.01)
H01Q 1/48 (2006.01)
G06K 19/077 (2006.01)
H01Q 1/38 (2006.01)
H01Q 9/04 (2006.01)

(52) U.S. Cl.
CPC ............ H01Q 1/48 (2013.01); G06K 19/07773 (2013.01); G06K 19/07783 (2013.01); H01Q 1/38 (2013.01); H01Q 9/0407 (2013.01)

(58) Field of Classification Search
CPC .... G06Q 30/02; G06Q 20/341; G07F 7/1008; B42D 15/10; G06K 19/07749
USPC ................... 235/375, 380, 487, 492; 343/895
See application file for complete search history.

(56) References Cited

U.S. PATENT DOCUMENTS

2004/0008153 A1*  1/2004  Lamensdorf et al. ......... 343/895

* cited by examiner

Primary Examiner — Karl D Frech
(74) Attorney, Agent, or Firm — Jacque R. Wilson, Esq.; Carson Boxberger LLP (57) ABSTRACT

A reduced ground plane shorted microstrip antenna comprising: a metal ground plane having a radius of about $0.24\lambda$; a substrate comprising a material having a dielectric constant of at least 4 disposed on top of said ground plane; a metal top layer including a radiating patch disposed on top of said substrate; a shorting wall disposed between said ground plane and said patch; and a power feedline connected to the metal top layer such that the top layer impedance and the feedline impedance match.

4 Claims, 6 Drawing Sheets

REDUCED GROUND PLANE SHORTED-PATCH HEMISPHERICAL OMNI ANTENNA

BACKGROUND

1. Field of the Art

The present invention relates to an antenna, and more particularly to a radio frequency identification tag antenna.

2. Description of the Prior Art

A patch antenna (also known as a rectangular microstrip antenna) is a type of radio antenna with a low profile, which can be mounted on a flat surface. It consists of a flat rectangular sheet or "patch" of metal, mounted over a larger sheet of metal called a ground plane. The assembly is usually contained inside a plastic dome, which protects the antenna structure from damage. Patch antennas are simple to fabricate and easy to modify and customize. They are the original type of microstrip antenna described by Howell[1]; the two metal sheets together form a resonant piece of microstrip transmission line with a length of approximately one-half wavelength of the radio waves. The radiation mechanism arises from discontinuities at each truncated edge of the microstrip transmission line. The radiation at the edges causes the antenna to act slightly larger electrically than its physical dimensions, so in order for the antenna to be resonant, a length of microstrip transmission line slightly shorter than one-half a wavelength at the frequency is used. A patch antenna is usually constructed on a dielectric substrate, using the same materials and lithography processes used to make printed circuit boards.

An antenna's power gain or simply gain is a key performance figure which combines the antenna's directivity and electrical efficiency. As a transmitting antenna, the figure describes how well the antenna converts input power into radio waves headed in a specified direction. As a receiving antenna, the figure describes how well the antenna converts radio waves arriving from a specified direction into electrical power. When no direction is specified, "gain" is understood to refer to the peak value of the gain. A plot of the gain as a function of direction is called the radiation pattern.

Antenna gain is usually defined as the ratio of the power produced by the antenna from a far-field source on the antenna's beam axis to the power produced by a hypothetical lossless isotropic antenna, which is equally sensitive to signals from all directions. Usually this ratio is expressed in decibels, and these units are referred to as "decibels-isotropic" (dBi). An alternate definition compares the antenna to the power received by a lossless half-wave dipole antenna, in which case the units are written as dBd. Since a lossless dipole antenna has a gain of 2.15 dBi, the relation between these units is: gain in dBd=gain in dBi−2.15 dB. For a given frequency the antenna's effective area is proportional to the power gain. An antenna's effective length is proportional to the square root of the antenna's gain for a particular frequency and radiation resistance. Due to reciprocity, the gain of any antenna when receiving is equal to its gain when transmitting.

Directive gain or directivity is a different measure which does not take an antenna's electrical efficiency into account. This term is sometimes more relevant in the case of a receiving antenna where one is concerned mainly with the ability of an antenna to receive signals from one direction while rejecting interfering signals coming from a different direction.

A directional antenna or beam antenna is an antenna which radiates greater power in one or more directions allowing for increased performance on transmit and receive and reduced interference from unwanted sources. Directional antennas like Yagi-Uda antennas provide increased performance over dipole antennas when a greater concentration of radiation in a certain direction is desired.

All practical antennas are at least somewhat directional, although usually only the direction in the plane parallel to the earth is considered, and practical antennas can easily be omni-directional in one plane.

The most common types are the Yagi-Uda antenna, the log-periodic antenna, and the corner reflector, which are frequently combined and commercially sold as residential TV antennas. Cellular repeaters often make use of external directional antennas to give a far greater signal than can be obtained on a standard cell phone. Satellite Television receivers usually use parabolic antennas. For long and medium wavelength frequencies, tower arrays are used in most cases as directional antennas.

The general rule in Antenna Theory is that an electrically small antenna is needed to produce low directivity. Thus, half-wave dipole antennas or half-wavelength slot antennas typically have directivities less than 3 dB, which is about as low of a directivity as one can obtain in practice. Conversely, high directivity antennas require many wavelengths in size. That is, antennas such as dish (or satellite) antennas and horn antennas have high directivity, in part because they are many wavelengths long. Thus, small antennas have broad radiation patterns (low directivity), and antennas with large uniform voltage or current distributions have very directional patterns (and thus, a high directivity).

In radio communication, an omni-directional antenna is an antenna which radiates radio wave power uniformly in all directions in one plane, with the radiated power decreasing with elevation angle above or below the plane, dropping to zero on the antenna's axis. This radiation pattern is often described as "doughnut shaped". Note that this is different from an isotropic antenna, which radiates equal power in all directions and has a "spherical" radiation pattern. Omni-directional antennas oriented vertically are widely used for non-directional antennas on the surface of the Earth because they radiate equally in all horizontal directions, while the power radiated drops off with elevation angle so little radio energy is aimed into the sky or down toward the earth and wasted. Omni-directional antennas are widely used for radio broadcasting antennas, and in mobile devices that use radio such as cell phones, FM radios, walkie-talkies, wireless computer networks, cordless phones, GPS as well as for base stations that communicate with mobile radios, such as police and taxi dispatchers and aircraft communications.

In telecommunication, a ground plane is a flat or nearly flat horizontal conducting surface that serves as part of an antenna, to reflect the radio waves from the other antenna elements. The plane does not necessarily have to be connected to ground. Ground planes are particularly used with monopole antennas.

To function as a ground plane, the conducting surface must be at least a quarter of the wavelength (λ/4) of the radio waves in size. In lower frequency antennas, such as the mast radiators used for broadcast antennas, the Earth itself (or a body of water such as a salt marsh or ocean) is used as a ground plane. For higher frequency antennas, in the VHF or UHF range, the ground plane can be smaller, and metal disks, screens or wires are used as ground planes. At upper VHF and UHF frequencies, the metal skin of a car or aircraft can serve as a ground plane for whip antennas projecting from it. The ground plane doesn't have to be a continuous surface. In the ground plane antenna the "plane" consists of several wires λ/4 long radiating from the base of a quarter wave whip antenna.

The radio waves from an antenna element that reflect off a ground plane appear to come from a mirror image of the antenna located on the other side of the ground plane. In a monopole antenna, the radiation pattern of the monopole plus the virtual "image antenna" make it appear as a two element center-fed dipole antenna. So a monopole mounted over an ideal ground plane has a radiation pattern identical to a dipole antenna. The feedline from the transmitter or receiver is connected between the bottom end of the monopole element and the ground plane. The ground plane must have good conductivity; any resistance in the ground plane is in series with the antenna, and serves to dissipate power from the transmitter.

Bandwidth is another fundamental antenna parameter. Bandwidth describes the range of frequencies over which the antenna can properly radiate or receive energy. Often, the desired bandwidth is one of the determining parameters used to decide upon an antenna. For instance, many antenna types have very narrow bandwidths and cannot be used for wideband operation.

Bandwidth is typically quoted in terms of VSWR. For instance, an antenna may be described as operating at 100-400 MHz with a VSWR<1.5. This statement implies that the reflection coefficient is less than 0.2 across the quoted frequency range. Hence, of the power delivered to the antenna, only 4% of the power is reflected back to the transmitter. Alternatively, the return loss-20*log 10(0.2)=−13.98 dB.

As an electro-magnetic wave travels through the different parts of the antenna system (radio, feed line, antenna, free space) it may encounter differences in impedance (E/H, V/I, etc.). At each interface, depending on the impedance match, some fraction of the wave's energy will reflect back to the source, forming a standing wave in the feed line. The ratio of maximum power to minimum power in the wave can be measured and is called the standing wave ratio (SWR). A SWR of 1:1 is ideal. A SWR of 1.5:1 is considered to be marginally acceptable in low power applications where power loss is more critical, although an SWR as high as 6:1 may still be usable with the right equipment. Minimizing impedance differences at each interface (impedance matching) will reduce SWR and maximize power transfer through each part of the antenna system.

Complex impedance of an antenna is related to the electrical length of the antenna at the wavelength in use. The impedance of an antenna can be matched to the feed line and radio by adjusting the impedance of the feed line, using the feed line as an impedance transformer. More commonly, the impedance is adjusted at the load (see below) with an antenna, a matching transformer, matching networks composed of inductors and capacitors, or matching sections such as the gamma match.

SUMMARY

Small size antennas are an important consideration for today's wireless Personal Communication Systems. Microstrip antennas are good candidates for these systems, and efforts to make them smaller have focused more on the reduction of the radiating patch size itself. Traditional methods of introducing shorting pins, slots, and the use of high dielectric substrates have all been used effectively. The problem is that size reduction must also concentrate on the reduction of the supporting ground plane. Thus, ground plane size reduction is becoming more important given the limited area available on the intended device.

In modern and mobile and wireless communications systems, there is an increasing demand for smaller low-cost antennas that can be easily integrated with packaging structures. It is well-known that planar antennas, e.g., a microstrip patch, have a significant number of advantages over conventional antennas, such as low profile, lightweight and low production cost. Nevertheless, in some mobile/wireless applications such as the AMPS/PCS, GSM/DCS, PDC/PHS, IMT 2000, or WLAN in the 2.4 GHz Industrial Scientific and Medical (ISM) band, their physical size may be too large for handheld terminals, or small transponders utilized for logistics and tracking applications. Thus, while a number of techniques have been proposed to reduce the physical size of a conventional half-wave (Lambda/2 is the guide wavelength in the substrate) patch antenna, there remains a need to provide viable technical and commercial solutions to this problem.

Advantageously, the present invention comprises an antenna design that reduces the overall size of an antenna that is required to provide a cross-polarized hemispherical operating envelope. To compensate for the adverse effects of truncating a ground plane, a non-planar cylindrical ring is placed around a shorted circular patch antenna. The ground plane is reduced from the commonly used radius of 0.6λ to a radius of 0.24λ while at the same time improving the impedance match and radiation performance.

This is accomplished in part by taking advantage of the fact that a conventional rectangular patch antenna operating at the fundamental mode (TEM 010 mode) has an electrical length of approximately Lambda/2, and the electric field is zero for the TM 010 mode at the middle of the patch. Thus, the patch antenna can be shorted along its middle line with a metal wall without significantly changing the resonant frequency of the antenna, resulting in a SRMPA antenna with an antenna length of approximately Lambda/4.

The electrically insulating substrate material (interior of printed circuit board or PCB) is comprised of a high dielectric and low loss tangent material that facilitates a drastic miniaturization (⅓ the size) and high efficiency operation of the device. Additionally, the design utilizes a shorted patch antenna structure (PCB) that allows the antenna to resonate at approximately ¼ the wavelength in the medium (high dielectric substrate). The overall length of the device is approximately $\frac{1}{12}^{th}$ the normal free space resonant length.

The present invention further provides a patch antenna having near hemispherical antenna pattern/coverage using a single conformal antenna element. The reduction of the ground plane broadens the main beam at the centroid (tangential to the ground plane), and causes multiple side lobes to form in a donut shape pattern that is nearly parallel to the ground plane in a circular pattern around the z-axis (see figure x). While the gain at the centroid is reduced, the broadened main beam pattern with the side lobes achieves a nearly hemispherical coverage by the single element conformal antenna. Additionally, the polarization purity diminishes as a result of the high dielectric material, and the "squared off" corners, resulting in improved "cross-polarization" response in the desired hemispherical region. This characteristic allows a greater diversity of orientation of the antenna, as well as by other linearly polarized devices attempting to "communicate" with the device utilizing this antenna.

Other advantages of the present invention will be apparent to those of skill in the art of antenna design upon reading the specification, drawings, and claims herein.

DETAILED DESCRIPTION OF THE EMBODIMENTS

The present invention, including the object and advantages of the same, will be further illustrated by the following detailed description of embodiments, which includes references to the relevant drawings where appropriate.

Figure 1:
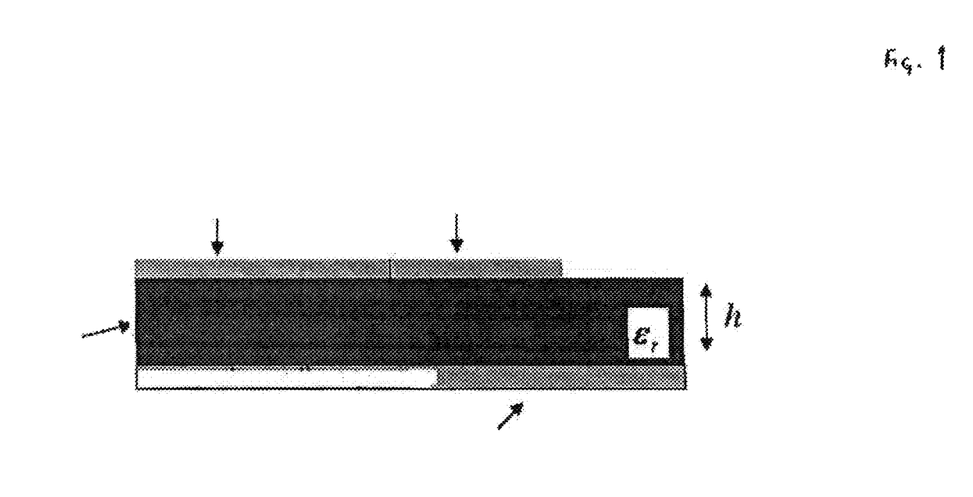
FIG. 1 shows a side view of a prior art Microstrip Patch Antenna (MPA).
Figure 2:
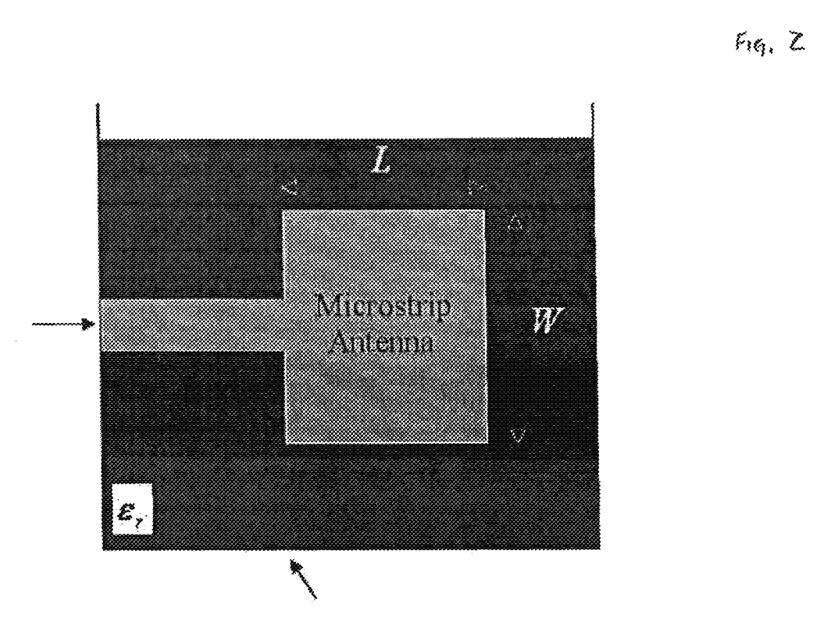
FIG. 2 shows a top view of a prior art MPA.
Figure 3:
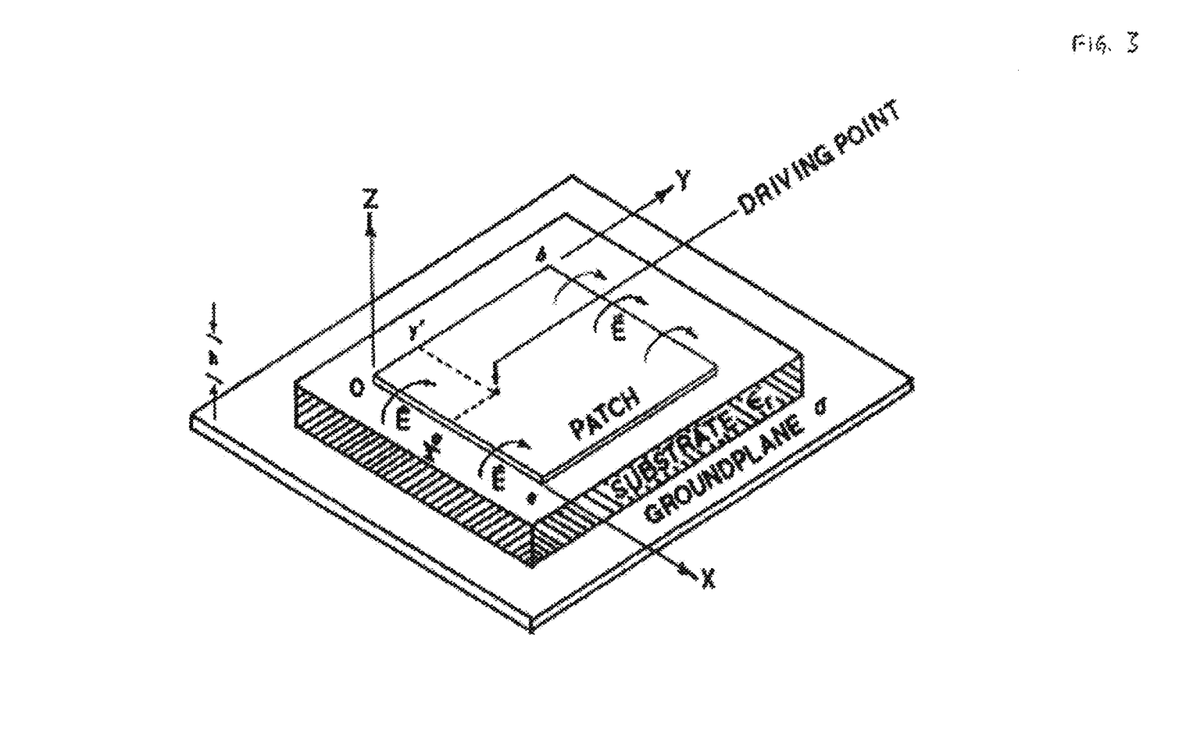
FIG. 3 shows a perspective view of an MPA.

Referring first to FIGS. 1, 2 and 3, there is shown a side elevation view, a top view, and a perspective view respectively of a prior art Microstrip Patch Antenna (MPA). Although there are many variations on MPA design, the basic configuration is shown in FIG. 1 and FIG. 2, where l is then length (relative to the feedpoint) and w is the width. In the simplest configuration, l=w=λeff/2, or an electrical one-half wavelength, including the shortening effect of the dielectric constant (Er) of the material between the patch and the conducting surface (or substrate) below. The two edges of the patch that are connected to, and opposite from, the feed connection provide the radiation, acting as slot antennas, where each slot is the gap between the edge of the patch and the ground plane beneath the intervening dielectric layer. The arrows at the left and right edges of the patch represent the currents between the patch conductor and ground plane. At the edges, where they are not contained, these currents result in the desired radiation of electromagnetic waves from the two edge slots. Thus, the microstrip feedline excites the center of the slot formed by the edge of patch that to which it is connected. Between the underside of the patch and the substrate ground place, a low impedance transmission line is formed that subsequently feeds the slot at the opposite side. Since the electrical length of this line is λ/2, the impedance at the fed edge is repeated at the other, which effectively feeds the two slots in-phase with nearly equal antenna currents. Thus, the patch operates as an array of two slots with a free-space separation somewhat less than λ/2. Maximum radiation is normal to the plane of the patch. Polarization is at right angles to the length of the slots, parallel to the feedline orientation shown in FIG. 1. Radiation toward the back of the substrate is greatly reduced by the shielding effects of the ground plane layer. The amount of reduction depends on the extent to which the ground plane extends beyond the patch area. To make a smaller product, any commercial antennas have ground planes that are only slightly larger than the patch. While they have less reduction of rearward radiation than a larger design, they still have useful gain and directivity. One familiar application of this type of patch antenna is the rectangular antenna (usually in a plastic housing) used widely in 2.4 GHz or 5 GHz WLAN systems.

Figure 4:
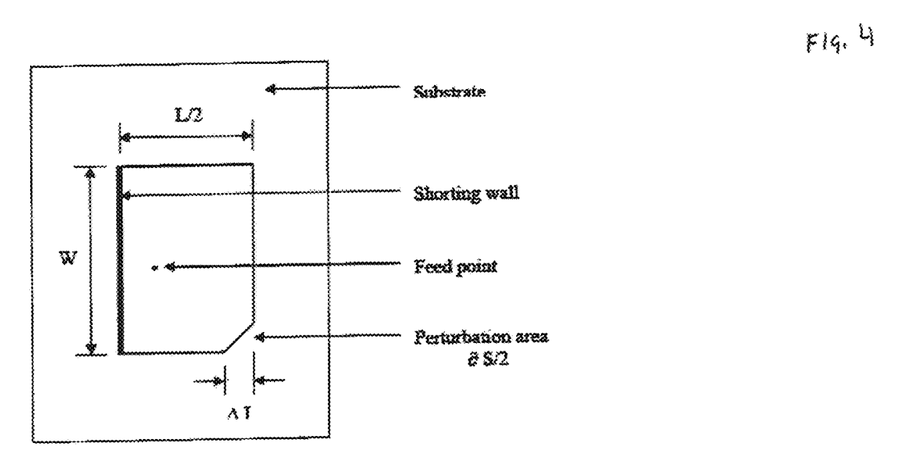
FIG. 4 shows a top view of a SRMPA according to the present invention.
Figure 5:
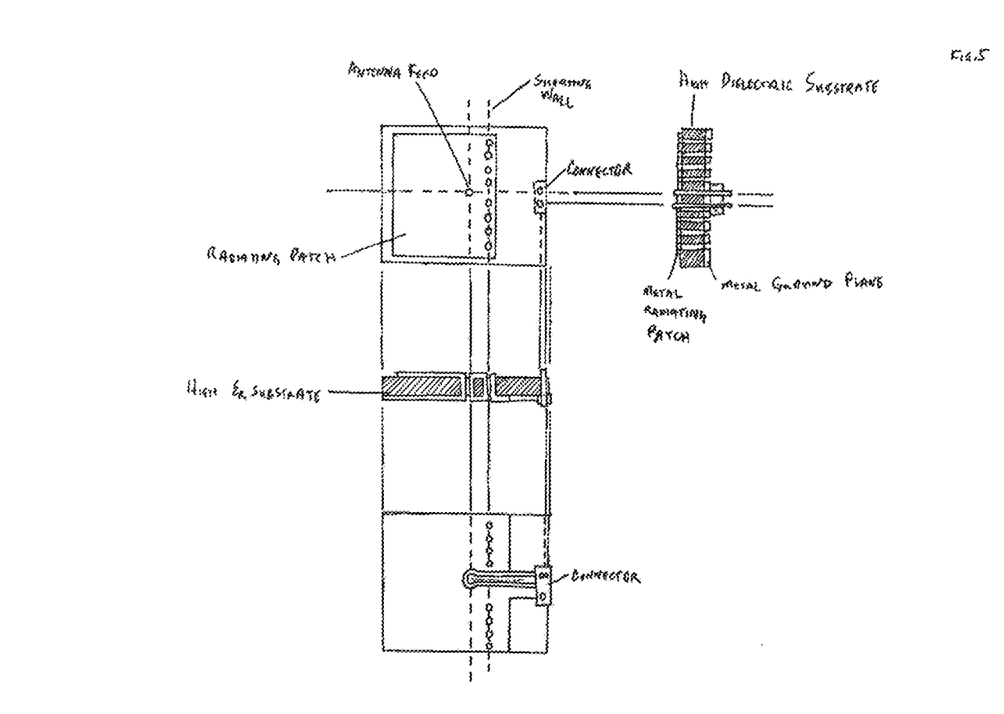
FIG. 5 shows a detailed view of a SRMPA according to the present invention.
Figure 6:
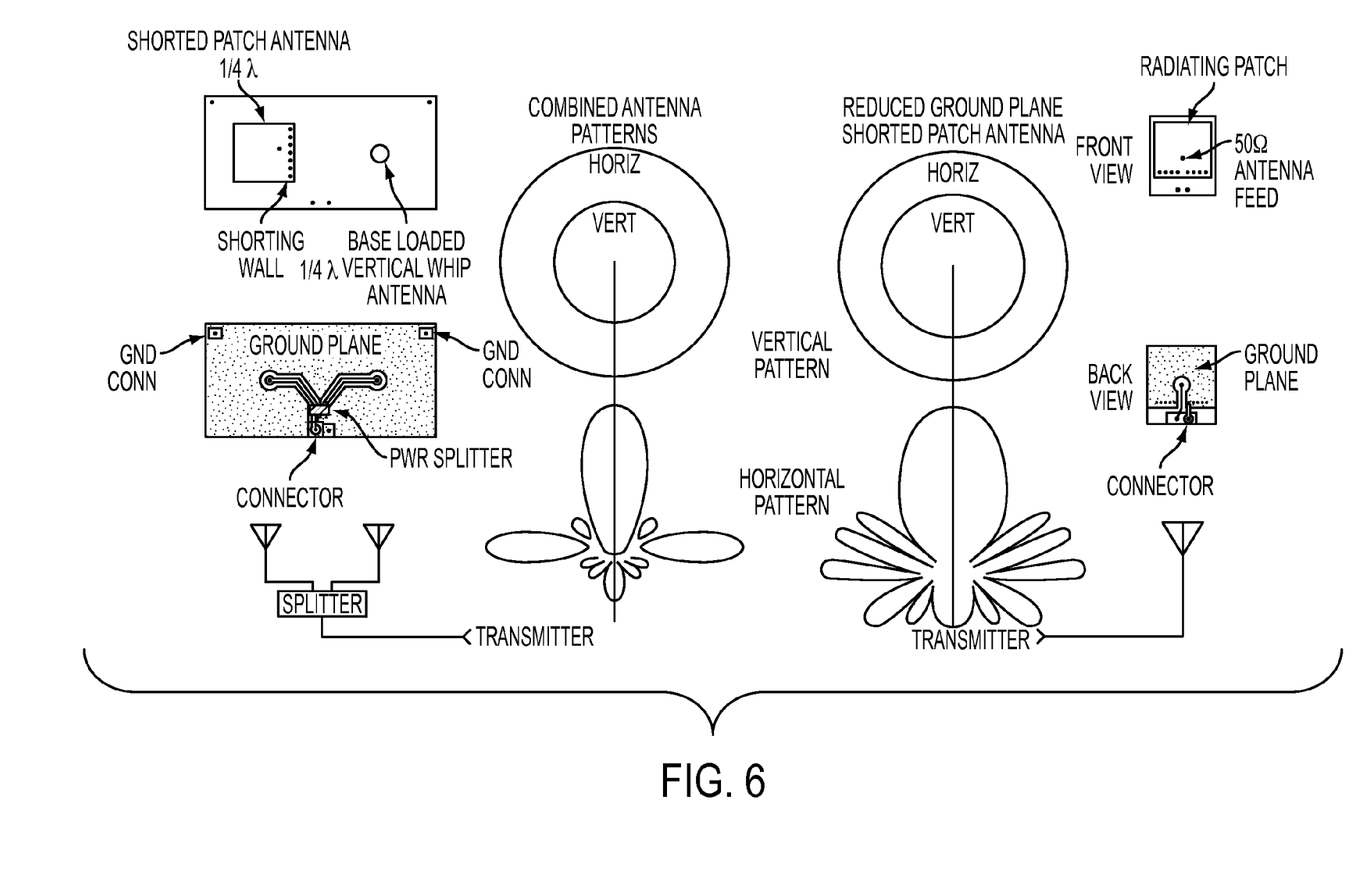
FIG. 6 shows several detailed views of a SRMPA according to the present invention and radiation patterns for the same.

Referring now to FIG. 4, FIG. 5, and FIG. 6, there are shown several views of a Shorted Rectangular Microstrip Patch Antenna (SRMPA) according to an embodiment of the present invention.

The SRMPA of the present invention generally comprises, as shown in FIGS. 4-6, a ground plane, a substrate on top of the ground plane, a power transmission or feed line that runs through the substrate and into a patch that is disposed on top of the substrate. Additionally, a metal shortening wall is disposed through said substrate between the patch and the ground plane.

In one preferred embodiment, a gain (referenced to linear isotropic radiator) of −12 dbli is realized where the dimensions of the SRMPA of the present invention are as follows:

1. The radiating patch is 0.400" L×0.500" W×0.003" H for a resonant center frequency of 2.425 Ghz
2. The dielectric substrate (Er=10.2) is 0.700" L×0.600" W×0.050" H
3. The ground plane is 0.500" L×0.600" W×0.003" H
4. The shorting wall runs from the edge of the radiating patch length all the way along the radiating patch width. The shorting wall passes through the substrate and attaches 0.050" from the edge of the ground plane length (0.050" of ground plane overhangs the radiating patch on the other end of the length dimension).
5. The antenna feed via (pass through) is connected 0.070" from the edge of the shorting wall of the radiating patch, and is centered along the width of the radiating patch, passing through the dielectric and connecting to the ground plane.

The patch antenna is thus shorted along its middle line with a metal wall without significantly changing the resonant frequency of the antenna, resulting in a SRMPA antenna with an antenna length of approximately Lambda/4.

The electrically insulating substrate material (interior of printed circuit board or PCB) is comprised of a high dielectric and low loss tangent material that facilitates a drastic miniaturization (⅓ the size) and high efficiency operation of the device. Additionally, the design utilizes a shorted patch antenna structure (PCB) that allows the antenna to resonate at approximately ¼ the wavelength in the medium (high dielectric substrate). The overall length of the device is approximately $\frac{1}{12}^{th}$ the normal free space resonant length.

Advantageously, the antenna design of the present invention reduces the overall size of a microstrip patch antenna (MSPA) that is required to provide a cross-polarized hemispherical operating envelope. The ground plane is reduced significantly in size while at the same time the impedance match and radiation performance of the MSPA is improved.

The size of a Microstrip Patch Antenna (MPA) is determined by its resonance length and width. A reduction of the patch size can be achieved by using a patch substrate material with very high permittivity and small substrate height. However, the low radiation efficiency will reduce the antenna gain.

For a rectangular MPA, its resonance frequency is on the order of half-wave length. The length of the antenna is reduced by a factor of two if the half wave patch is short-circuited to the ground at the zero potential planes. The result is a resonance rectangular patch with length of order λ/4, called a quarter-wave patch or Shorted Rectangular Microstrip Patch Antenna (SRMPA).

The SRMPA geometry is shown in FIG. 4. The feed point is centered on the x-axis and the shorting wall is at the patch edge. The antenna is circularly polarized (CP) by the single feed technique with a truncated segment setting to the edge of the patch with equal side length (ΔL) and area of δS/2. The SRMPA has a side length L/2 and width W. The input impedance and resonance frequency of a SRMPA can be controlled by changing the length of the shorting wall. When the shorting wall length is reduced, the resonance frequency is decreased. To have the same resonance frequency, the patch lengths (L/2, W) have to be reduced resulting in patch size reduction. Due to the reduction in the patch size, the patch axial ratio (AR) will be degraded. To improve the AR, the perturbation segment length (ΔL) must be readjusted.

The present inventors have discovered that utilizing a an electrically insulating substrate material comprised of a high dielectric and low loss tangent material facilitates the production of a SRMPA is greatly diminished size and greatly increased efficiency. Additionally, the design utilizes a shorted patch antenna structure that allows the antenna to resonate at approximately ¼ the wavelength in the medium (high dielectric substrate). Additionally, the overall length of the device is approximately $1/12^{th}$ the normal free space resonant length.

The present invention further provides a SRMPA having near hemispherical antenna pattern/coverage using a single conformal antenna element. The reduction of the ground plane broadens the main beam at the centroid (tangential to the ground plane), and causes multiple side lobes to form in a donut shape pattern that is nearly parallel to the ground plane in a circular pattern around the z-axis. While the gain at the centroid is reduced, the broadened main beam pattern with the side lobes achieves a nearly hemispherical coverage by the single element conformal antenna. Additionally, the polarization purity diminishes as a result of the high dielectric material, and the "squared off" corners, resulting in improved "cross-polarization" response in the desired hemispherical region. This characteristic allows a greater diversity of orientation of the antenna, as well as by other linearly polarized devices attempting to "communicate" with the device utilizing this antenna.

It should be understood that the above description is of a preferred embodiment and included for illustrative purposes only, and it is not meant to be limiting of the invention. A person skilled in the art will understand that variations of this invention are included within the scope of the claims.

The invention claimed is:

1. An omni-directional shorted rectangular microstrip antenna having a reduced area ground plane, said antenna comprising:
   a. a rectangular, metal, ground plane having a length along the of about 0.24λ, where λ is the free space wavelength of the antenna;
   b. a substrate disposed on top of said ground plane, said substrate comprising a material having a dielectric constant of at least 4 and a bore for accepting a power feedline;
   c. a radiating patch disposed on top of said substrate and connected to said feedline, said patch having a length measured from the connection point of the feedline to one side of the patch and width, said width equaling the distance measured between opposing sides of the patch perpendicular to the length of the patch;
   d. a shorting wall disposed between said ground plane and said patch at a predetermined location relative to the ground plane and the patch; and
   e. a power feedline, said feedline connected to said patch through said substrate, where said antenna has a gain of −12 dbli.

2. An omni-directional shorted rectangular microstrip antenna having a reduced area ground plane, said antenna comprising:
   a. a rectangular, metal, ground plane having a length along the of about 0.24λ, where λ is the free space wavelength of the antenna;
   b. a substrate disposed on top of said ground plane, said substrate comprising a material having a dielectric constant of at least 4 and a bore for accepting a power feedline;
   c. a radiating patch disposed on top of said substrate and connected to said feedline, said patch having a length measured from the connection point of the feedline to one side of the patch and width, said width equaling the distance measured between opposing sides of the patch perpendicular to the length of the patch;
   d. a shorting wall disposed between said ground plane and said patch at a predetermined location relative to the ground plane and the patch; and
   e. a power feedline, said feedline connected to said patch through said substrate, where said antenna has an overall length of approximately $1/12^{th}$ the normal free space resonant length.

3. A radio frequency identification (RFID) tag attached to an object, and transmitting electromagnetic waves that correspond to identification information, the RFID tag comprising: an RFID tag chip modulating the electromagnetic waves based on the identification information; and an RFID tag antenna transmitting the modulated electromagnetic waves, wherein the RFID tag antenna comprises a polyhedral dielectric material having dielectric constant of at least about 4 and having a first surface having a length of 0.24λ that contacts the object and a second surface that is parallel with the first surface, a radiating patch formed on at least one part of the second surface and radiating the electromagnetic waves, at least one slit formed on at least one part of the radiating patch to expose the dielectric material, and a feed line formed to be connected to the RFID chip on at least one at least one part of an area of the second surface where the radiating patch is not formed, and supplying power to the RFID tag chip through magnetic coupling with the radiating patch, wherein said antenna has a gain of −12 dbli.

4. A radio frequency identification (RFID) tag attached to an object, and transmitting electromagnetic waves that correspond to identification information, the RFID tag comprising: an RFID tag chip modulating the electromagnetic waves based on the identification information; and an RFID tag antenna transmitting the modulated electromagnetic waves, wherein the RFID tag antenna comprises a polyhedral dielectric material having dielectric constant of at least about 4 and having a first surface having a length of 0.24λ that contacts the object and a second surface that is parallel with the first surface, a radiating patch formed on at least one part of the second surface and radiating the electromagnetic waves, at least one slit formed on at least one part of the radiating patch to expose the dielectric material, and a feed line formed to be connected to the RFID chip on at least one at least one part of an area of the second surface where the radiating patch is not formed, and supplying power to the RFID tag chip through magnetic coupling with the radiating patch, wherein said antenna has an overall length of approximately $1/12^{th}$ the normal free space resonant length.

\* \* \* \* \*